United States Patent
Jagoda

(10) Patent No.: US 9,963,855 B2
(45) Date of Patent: May 8, 2018

(54) METHOD AND APPARATUS FOR RECOVERING INERTIAL ENERGY

(75) Inventor: Aaron Hertzel Jagoda, St. Louis Park, MN (US)

(73) Assignee: Eaton Intelligent Power Limited, Dublin (IE)

( * ) Notice: Subject to any disclaimer, the term of this patent is extended or adjusted under 35 U.S.C. 154(b) by 706 days.

(21) Appl. No.: 13/572,115

(22) Filed: Aug. 10, 2012

(65) Prior Publication Data

US 2013/0061588 A1    Mar. 14, 2013

Related U.S. Application Data

(60) Provisional application No. 61/523,110, filed on Aug. 12, 2011, provisional application No. 61/523,524, filed on Aug. 15, 2011.

(51) Int. Cl.
*F15B 1/027* (2006.01)
*E02F 9/22* (2006.01)
(Continued)

(52) U.S. Cl.
CPC .............. *E02F 9/2217* (2013.01); *B60K 6/12* (2013.01); *B66C 13/28* (2013.01); *E02F 9/128* (2013.01);
(Continued)

(58) Field of Classification Search
CPC .. F15B 1/024; F15B 1/033; F15B 3/00; F15B 21/14
See application file for complete search history.

(56) References Cited

U.S. PATENT DOCUMENTS 3,113,581 A    12/1963  Presnell
3,892,283 A     7/1975  Johnson
(Continued)

FOREIGN PATENT DOCUMENTS

DE    10 2006 046 127 A1    4/2008
DE    10 2009 053 702 A1    5/2011
(Continued)

OTHER PUBLICATIONS

International Search Report and Written Opinion for PCT/US2012/049962 dated Feb. 19, 2013.
(Continued)

*Primary Examiner* — Michael Leslie
*Assistant Examiner* — Matthew Wiblin
(74) *Attorney, Agent, or Firm* — Merchant & Gould P.C.

(57) ABSTRACT

A hydraulic system adapted to recover inertial energy is disclosed. The hydraulic system includes a pump, a variable displacement pump/motor having an input/output shaft, an accumulator, and a valve arrangement. The valve arrangement is operable in: a) a first mode where the variable displacement pump/motor is driven by the pump to rotate the input/output shaft and the load; b) a second mode where the variable displacement pump/motor uses inertial energy from a deceleration of the load to charge the accumulator; and c) a third mode where the variable displacement pump/motor is driven by the accumulator to rotate the input/output shaft and the load. The hydraulic system also includes a controller for controlling operation of the pump, the variable displacement pump/motor and the valve arrangement.

24 Claims, 10 Drawing Sheets

(51) Int. Cl.
*B60K 6/12* (2006.01)
*B66C 13/28* (2006.01)
*E02F 9/12* (2006.01)
*E02F 9/20* (2006.01)
*F16H 61/4096* (2010.01)
*F16H 61/4148* (2010.01)
*F15B 1/02* (2006.01)

(52) U.S. Cl.
CPC .......... *E02F 9/2004* (2013.01); *E02F 9/2025* (2013.01); *E02F 9/2267* (2013.01); *F15B 1/024* (2013.01); *F16H 61/4096* (2013.01); *F16H 61/4148* (2013.01); *Y02T 10/6208* (2013.01)

(56) References Cited

U.S. PATENT DOCUMENTS

| | | | |
|---|---|---|---|
| 4,026,107 A | | 5/1977 | Kosek et al. |
| 4,068,728 A | | 1/1978 | Subrick |
| 4,108,198 A | | 8/1978 | England |
| 4,261,431 A | | 4/1981 | Hawbaker |
| 4,528,892 A | | 7/1985 | Okabe et al. |
| 4,553,391 A | | 11/1985 | Reinhardt |
| 4,561,250 A | * | 12/1985 | Aoyagi et al. ............... 60/430 |
| 4,586,332 A | | 5/1986 | Schexnayder |
| 4,693,080 A | | 9/1987 | Van Hooff |
| 4,707,993 A | | 11/1987 | Kime |
| 5,197,283 A | * | 3/1993 | Kagiwada et al. ............ 60/464 |
| 5,285,641 A | | 2/1994 | Goto et al. |
| 5,381,661 A | | 1/1995 | Malina |
| 5,794,437 A | | 8/1998 | Lisniansky |
| 5,794,438 A | | 8/1998 | Lisniansky |
| 5,794,441 A | | 8/1998 | Lisniansky |
| 5,852,933 A | | 12/1998 | Schmidt |
| 5,916,139 A | | 6/1999 | Tieben |
| 6,005,360 A | | 12/1999 | Pace |
| 6,009,708 A | | 1/2000 | Miki et al. |
| 6,125,828 A | | 10/2000 | Hu |
| 6,151,894 A | * | 11/2000 | Endo et al. ............... 60/414 |
| 6,223,529 B1 | | 5/2001 | Achten |
| 6,370,873 B1 | | 4/2002 | Schaich et al. |
| 6,378,301 B2 | | 4/2002 | Endo et al. |
| 6,438,951 B2 | | 8/2002 | Morgan |
| 6,460,332 B1 | | 10/2002 | Maruta et al. |
| 6,497,558 B1 | | 12/2002 | Hale |
| 6,575,076 B1 | | 6/2003 | Achten |
| 6,725,581 B2 | | 4/2004 | Naruse et al. |
| 6,854,268 B2 | | 2/2005 | Fales et al. |
| 6,857,441 B2 | | 2/2005 | Flavelle |
| 6,887,045 B2 | | 5/2005 | Schaeffer |
| 7,086,226 B2 | | 8/2006 | Oguri |
| 7,201,095 B2 | | 4/2007 | Hughey |
| 7,234,298 B2 | | 6/2007 | Brinkman et al. |
| 7,775,040 B2 | | 8/2010 | Khalil |
| 7,908,852 B2 | | 3/2011 | Zhang et al. |
| 2001/0035011 A1 | | 11/2001 | Endo et al. |
| 2002/0104313 A1 | | 8/2002 | Clarke |
| 2003/0110766 A1 | | 6/2003 | Berlinger et al. |
| 2003/0221339 A1 | | 12/2003 | Naruse et al. |
| 2004/0060430 A1 | | 4/2004 | Brinkman |
| 2004/0107699 A1 | | 6/2004 | Fales et al. |
| 2005/0042121 A1 | * | 2/2005 | Suzuki et al. ............... 417/440 |
| 2005/0279088 A1 | | 12/2005 | Kim |
| 2006/0051223 A1 | | 3/2006 | Mark et al. |
| 2007/0049439 A1 | | 3/2007 | Garnett |
| 2008/0104955 A1 | | 5/2008 | Khalil |
| 2009/0036264 A1 | * | 2/2009 | Tozawa et al. ............... 477/5 |
| 2009/0100830 A1 | | 4/2009 | Schneider et al. |
| 2009/0178399 A1 | | 7/2009 | Bishop |
| 2009/0241534 A1 | | 10/2009 | Tikkanen et al. |
| 2010/0222970 A1 | * | 9/2010 | Shono et al. ............... 701/50 |
| 2010/0236232 A1 | | 9/2010 | Boehm et al. |
| 2013/0061587 A1 | | 3/2013 | Jagoda |
| 2014/0166114 A1 | | 6/2014 | Wang et al. |

FOREIGN PATENT DOCUMENTS

| | | |
|---|---|---|
| EP | 1 433 648 A2 | 6/2004 |
| JP | 2004-28212 | 1/2004 |
| WO | WO 03/058034 A1 | 7/2003 |
| WO | WO 2006/083163 A1 | 8/2006 |
| WO | WO 2006/094990 A1 | 9/2006 |
| WO | WO 2013/025459 A1 | 2/2013 |

OTHER PUBLICATIONS

International Search Report and Written Opinion for PCT/US2012/050242 dated Oct. 26, 2012.
Series 90 Axial Piston Motors, Technical Information, Sauer Danfoss, 44 pages (Sep. 2008).
The Hydrid: A Hydraulic Series Hybrid, Innas, 8 pages (Publicly known at least as early as Jul. 28, 2011).
Invitation to Pay Additional Fees with Partial International Search dated Nov. 9, 2012.

* cited by examiner

METHOD AND APPARATUS FOR RECOVERING INERTIAL ENERGY

CROSS REFERENCE TO RELATED APPLICATIONS

The present application claims the benefit of U.S. Provisional Patent Application Ser. No. 61/523,110, entitled Method and Apparatus for Recovering Inertial Energy, and filed on Aug. 12, 2011, and also claims the benefit of U.S. Provisional Patent Application Ser. No. 61/523,524, entitled Method and Apparatus for Recovering Inertial Energy, and filed on Aug. 15, 2011, the disclosures of which are hereby incorporated by reference in their entirety.

BACKGROUND

Excavators often use hydraulically powered linear and rotary actuators to drive relative movement of various linkages and rotating joints of the excavator. Typically, the linear actuators are hydraulic cylinders and the rotary actuators are hydraulic motors. The hydraulic cylinders and motors can be controlled by a control system. The control system can be operated by an operator. The operator can thereby operate and control the excavator including the hydraulic cylinders and motors of the excavator.

Many conventional excavators control the hydraulic cylinders and/or motors by throttling hydraulic fluid flow to and/or from the hydraulic cylinders and/or motors. The throttling typically wastes energy by converting energy of the hydraulic fluid flow at a pressure into heat energy. This heat energy often must be removed by a cooling system of the excavator. This wasted heat energy increases the power consumption (e.g. fuel consumption) of the excavator.

Many conventional excavators dissipate inertial energy in the relative movement of the linkages and across the rotating joints by throttling hydraulic fluid flow to and/or from the hydraulic cylinders and/or motors. This throttling also typically wastes energy by converting the inertial energy of the relative movements into heat energy via the hydraulic throttling. This heat energy also often must be removed by a cooling system of the excavator. This heat energy also originates as power consumption (e.g. fuel consumption) of the excavator.

Electrical hybrid systems have been developed to assist in recovering energy. However, such systems can be fairly expensive and reliance on complex electrical/electronic based systems having high voltage energy storage can raise serviceability and reliability issues.

Systems such as the one disclosed at U.S. Pat. No. 7,908,852 use hydraulic accumulators to store and re-use hydraulic potential energy. However, such systems rely primarily on throttling valves to provide decelerations thereby reducing the overall efficiency of the systems.

SUMMARY

An aspect of the present disclosure relates to a method and apparatus for recovering inertial energy.

Another aspect of the present disclosure relates to a hydraulic system adapted to recover inertial energy. The hydraulic system includes a pump, a variable displacement pump/motor having an input/output shaft, an accumulator and a valve arrangement. The valve arrangement is operable in: a) a first mode where the variable displacement pump/motor is driven by the pump to rotate the input/output shaft and the load; b) a second mode where the variable displacement pump/motor uses inertial energy from a deceleration of the load to charge the accumulator; and c) a third mode where the variable displacement pump/motor is driven by the accumulator to rotate the input/output shaft and the load. The hydraulic system also includes a controller for controlling operation of the pump, the variable displacement pump/motor and the valve arrangement.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
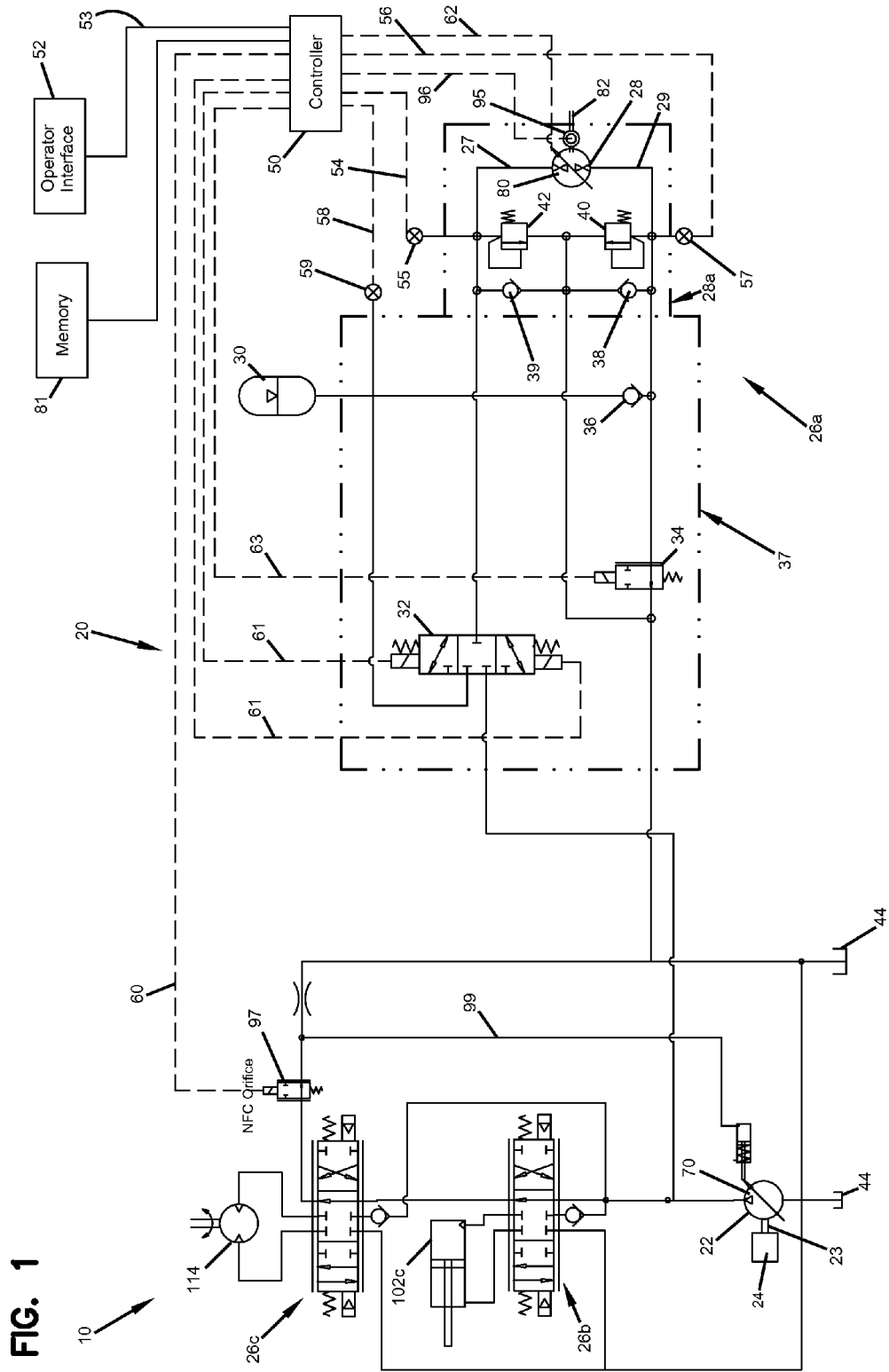
FIG. 1 is a schematic representation of a fluid system having exemplary features of aspects in accordance with the principles of the present disclosure.

Referring now to FIGS. 1-6, a schematic representation of a fluid system, generally designated 10, in accordance with the principles of the present disclosure is shown. The fluid system 10 is adapted for use on various excavating machines or other equipment. FIGS. 1-6 illustrate a hydraulic circuit configuration 20. The hydraulic circuit configuration 20 includes a hydraulic pump 22 that is powered by a prime mover 24 (e.g., a power source such as a diesel engine, a spark ignition engine or an electric motor). The pump 22 draws hydraulic fluid from a tank 44 (i.e., a reservoir) and provides pressurized hydraulic fluid to a plurality of load circuits. For example, FIG. 1 shows the hydraulic circuit configuration 20 configured such that the pump 22 provides pressurized hydraulic fluid to a first load circuit 26a, a second load circuit 26b and a third load circuit 26c.

As depicted at FIG. 1, the first load circuit 26a is an energy efficient load circuit having a variable displacement pump/motor 28 and an accumulator 30 adapted for recovering energy associated with a deceleration of a working load (e.g., an upper structure of an excavator) connected to the variable displacement pump/motor 28. A valve arrangement is used to control hydraulic fluid flow through the load circuit 26a. The valve arrangement includes a directional flow control valve 32 which, in the depicted embodiment, is a three-position valve. The valve arrangement also includes a return flow control valve 34, a first check valve 36, a second check valve 38, a third check valve 39, a first pressure relief valve 40, and a second pressure relief valve 42. The pressure relief valves 40, 42 function as cross port relief valves that limit the differential pressure across the pump/motor 28 by connecting the two sides when a set pressure is exceeded (see FIGS. 5 and 6). An electronic controller 50 controls operation of the pump/motor 28 such that a desired torque level is transferred through an input/output shaft 82 of the pump/motor 28. In certain embodiments, the torque level transferred through the shaft 82 can be changed by changing the volumetric hydraulic fluid displacement of the pump/motor 28 (e.g., the amount of fluid displaced by the pump/motor in one rotation of the shaft 82). By controlling the torque transferred through the shaft 82, the shaft 82 and a corresponding working load connected to the shaft 82 can be accelerated and decelerated, and the need for throttling during decelerations can be minimized or eliminated.

In certain embodiments, the second check valve 38, the third check valve 39, the first pressure relief valve 40, and the second pressure relief valve 42 are all integrated into a unit along with the pump/motor 28 to form a pump/motor unit 28a. Also, the directional control valve 32, the return flow valve 34, and the first check valve 36 can be incorporated into a valve body 37 so as to form a valve unit. In other embodiments, the system can be packaged with the pump/motor 28, the check valves 36, 38, and 39, the pressure relief valves 40, 42, the directional flow control valve 32, and the return valve 34 in one integrated unit.

Figure 2:
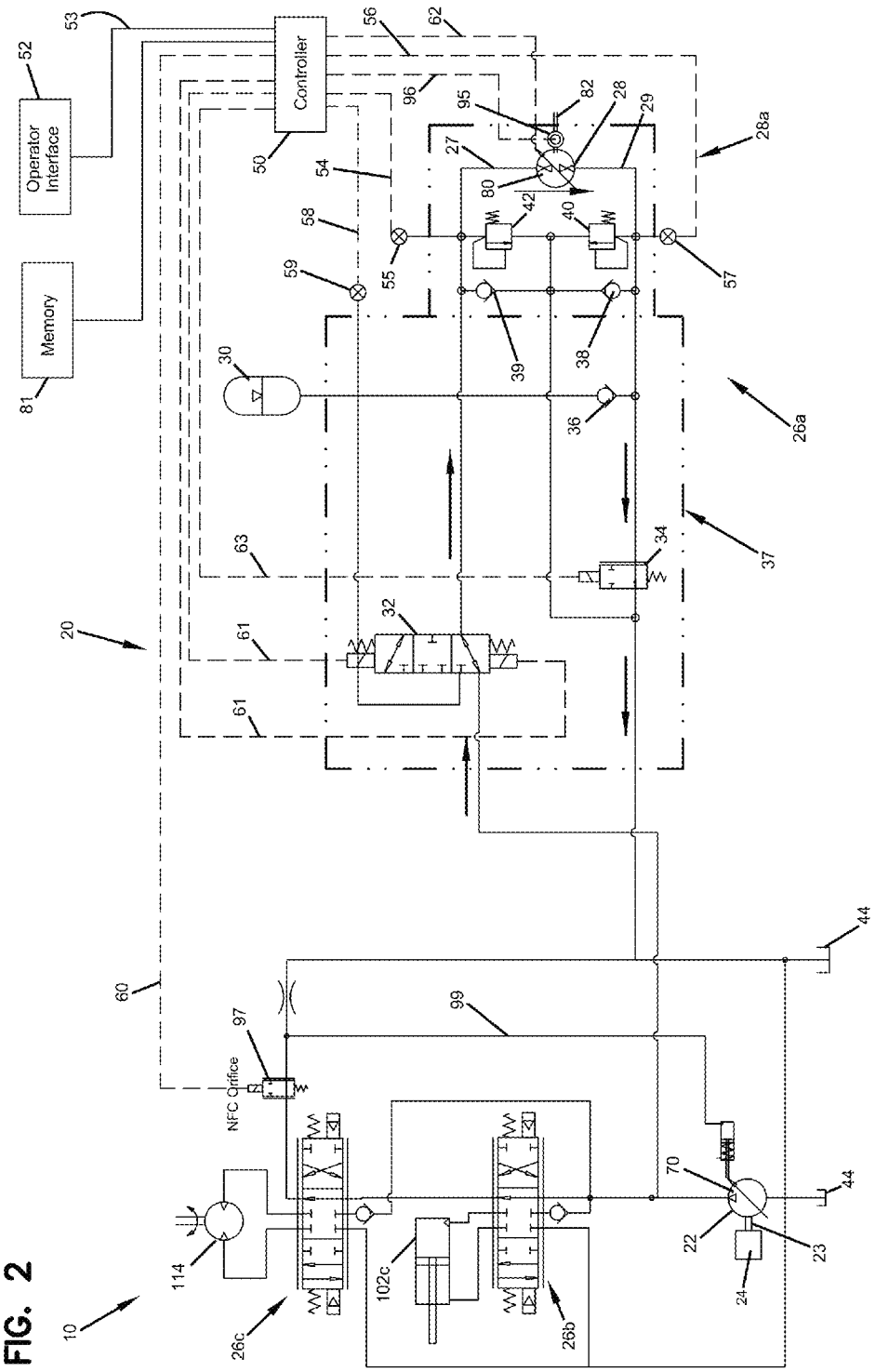
FIG. 2 is a schematic representation of the fluid system of FIG. 1 in a first mode of operation.

FIG. 2 shows the first load circuit 26a operating in a first mode where pressurized hydraulic fluid from the pump 22 is used to drive/power the variable displacement pump/motor 28 to cause rotation of the input/output shaft 82 and the load coupled to the shaft 82. The first mode can be referred to as a "pump drive" mode. In this mode, the pump/motor 28 functions as a motor and drives (e.g., accelerates) rotation of the shaft 82 and the corresponding working load. In the pump drive mode, the directional flow control valve 32 places an outlet side (i.e., a high pressure side) of the pump 22 in fluid communication with a first side 27 (i.e., a high pressure side or an inlet side) of the variable displacement pump/motor 28 and the return flow control valve 34 places a second side 29 (i.e., an outlet side or a low pressure side) of the variable displacement pump/motor 28 in fluid communication with the tank 44.

Figure 3:
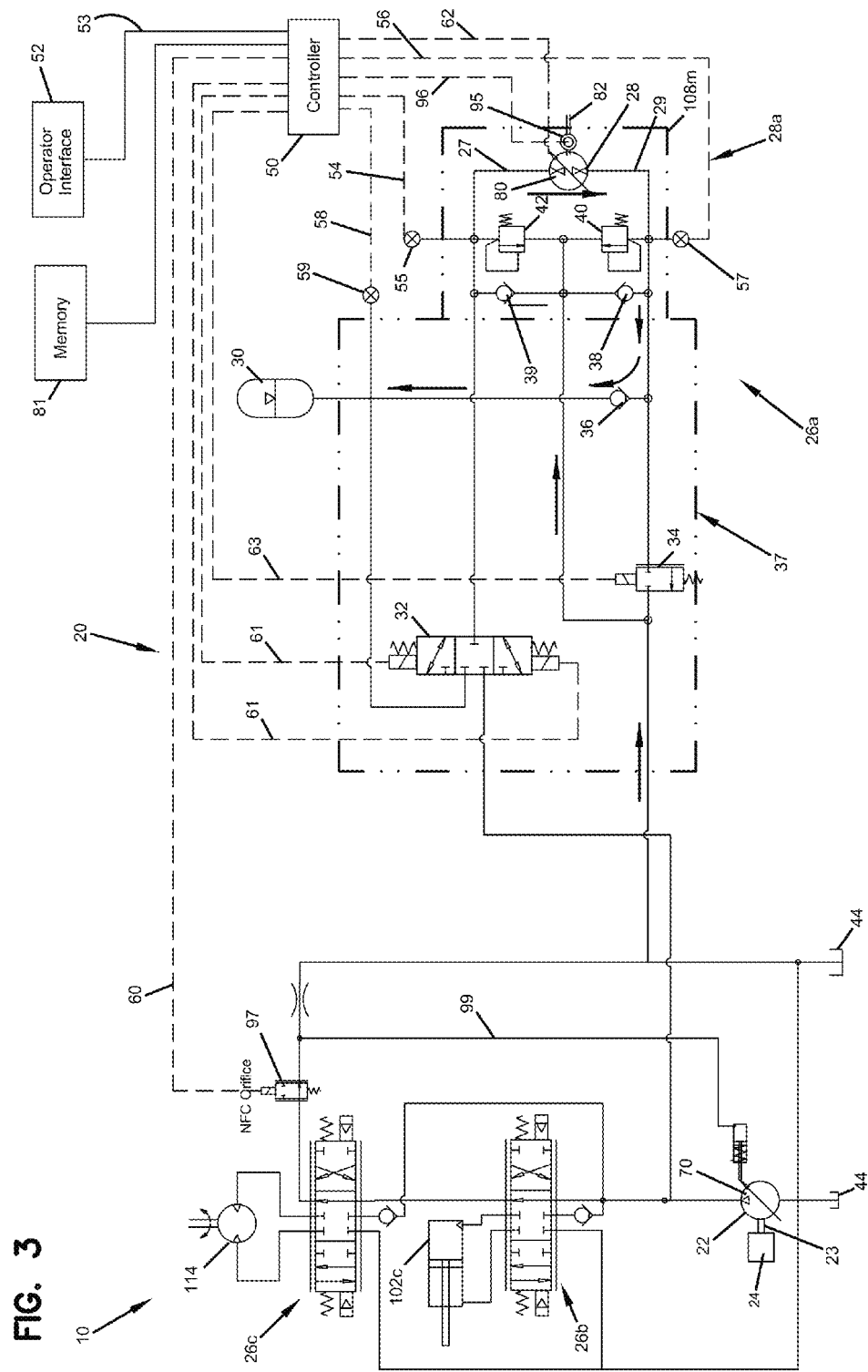
FIG. 3 is a schematic representation of the fluid system of FIG. 1 in a second mode of operation.

FIG. 3 shows the first load circuit 26a operating in a second mode where energy corresponding to a deceleration of a load connected to the input/output shaft 82 of the variable displacement pump/motor 28 is used to pressure charge the accumulator 30. The second mode can be referred to as a "charge" mode. In this mode, the pump/motor 28 functions as a pump and provides a braking function to provide a controlled deceleration of the rotation of the shaft 82 and the working load coupled to the shaft 82. When the first load circuit 26a is in the charge mode, the directional control valve 32 blocks fluid communication between the pump 22 and the first side 27 of the variable displacement pump/motor 28 and the return flow control valve 34 blocks fluid communication between the second side 29 of the variable displacement pump/motor 28 and the tank 44. Displacement of hydraulic fluid by the variable displacement pump/motor 28 during the deceleration causes hydraulic fluid flow to be directed from the second side 29 of the variable displacement pump/motor 28 past the first check valve 36 to the accumulator 30 so as to charge the accumulator 30. Concurrently, hydraulic fluid is drawn from the tank 44 past the third check valve 39 toward the first side 27 of the variable displacement pump/motor 28.

Figure 4:
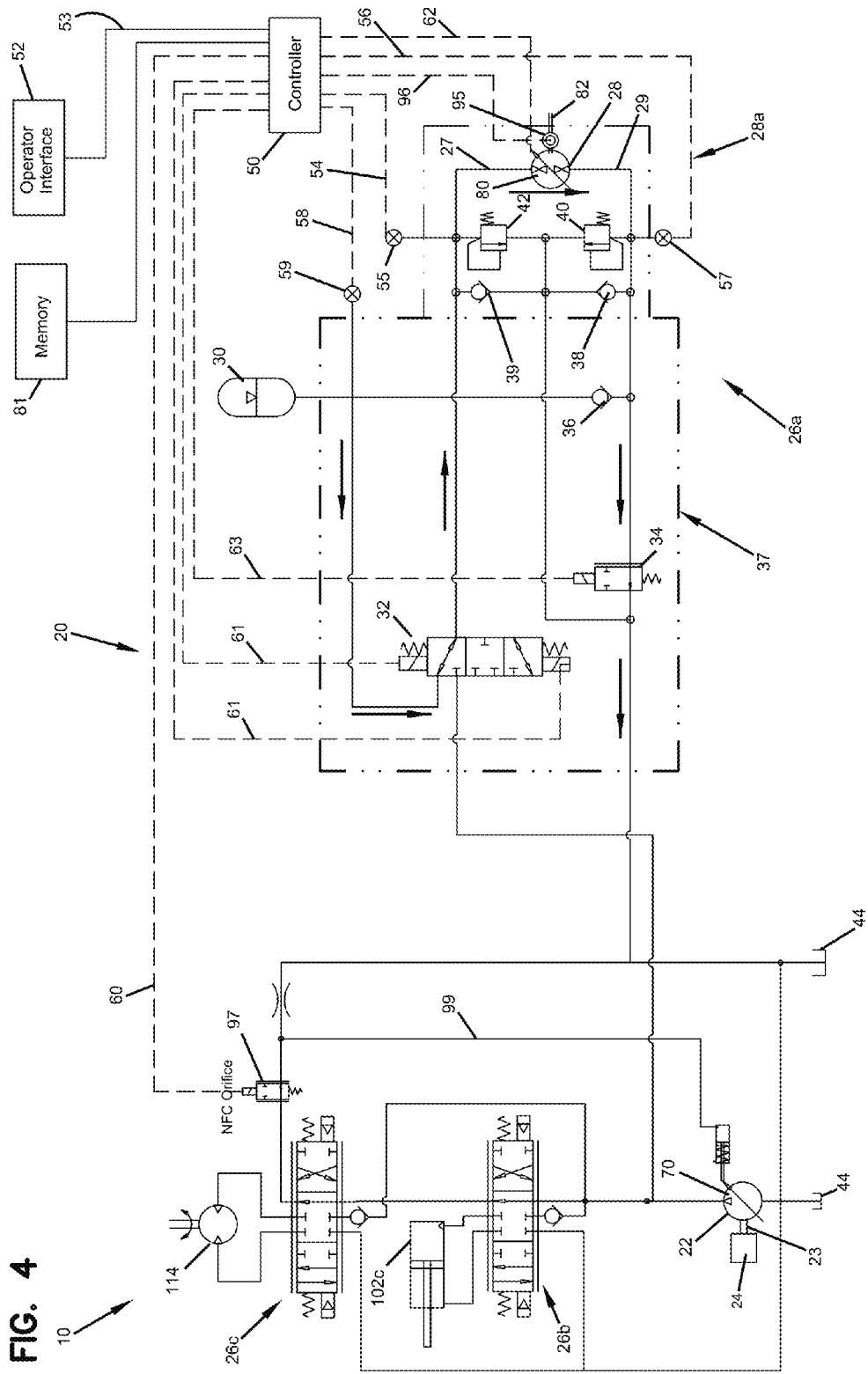
FIG. 4 is a schematic representation of the fluid system of FIG. 1 in a third mode of operation.
Figure 5:
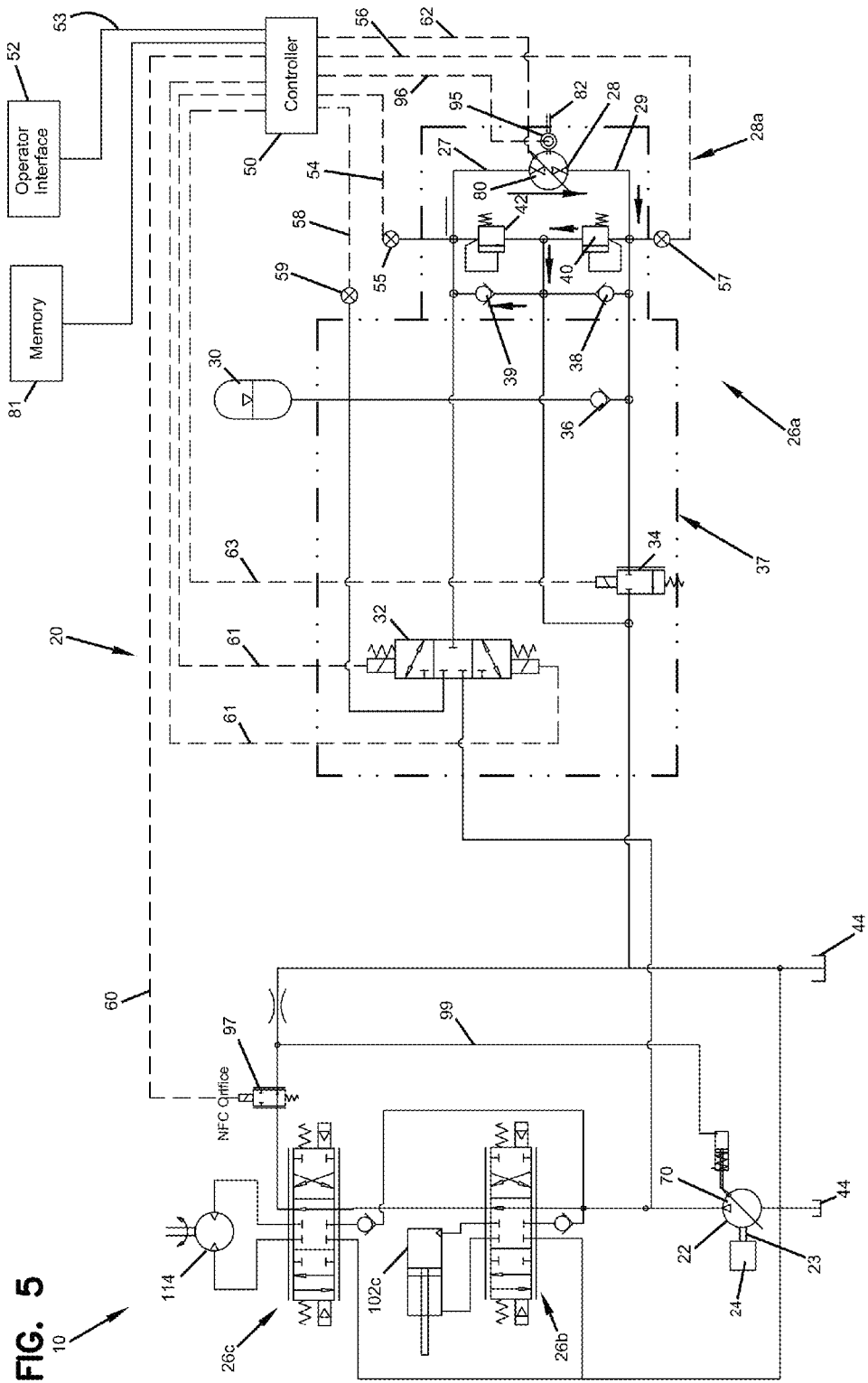
FIG. 5 is a schematic representation of the fluid system of FIG. 1 in a first pressure relief mode.
Figure 6:
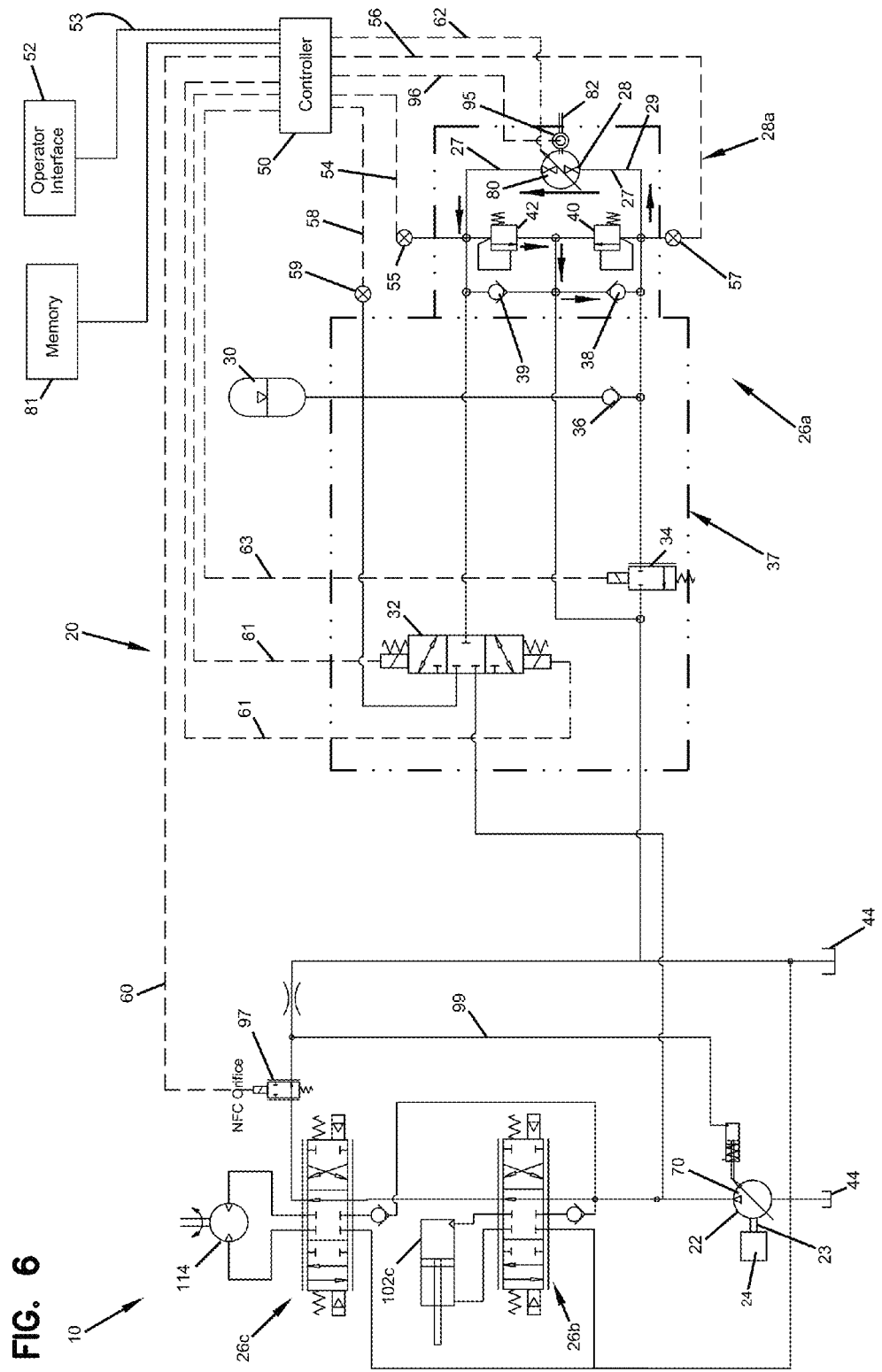
FIG. 6 is a schematic representation of the fluid system of FIG. 1 in a second pressure relief mode.

FIG. 4 shows the first load circuit 26a operating in a third mode in which hydraulic pressure from the accumulator 30 is used to drive/power the variable displacement pump/motor 28 to cause rotation of the input/output shaft 82 and the load coupled to the input/output shaft 82. The third mode can be referred to as an "accumulator discharge" mode. The pump/motor 28 functions as a motor in this mode. In this mode, the directional flow control valve 32 places the accumulator 30 in fluid communication with the first side 27 of the variable displacement pump/motor 28. The directional flow control valve 32 also disconnects the high pressure side of the pump 22 from the first side 27 of the variable displacement pump/motor 28. Further, the return flow control valve 34 places the second side 29 of the variable displacement pump/motor 28 in fluid communication with the tank 44. In the accumulator discharge mode, accumulated hydraulic pressure from the accumulator 30 is used to accelerate or otherwise drive the variable displacement pump/motor 28.

Referring back to FIG. 1, operation of the hydraulic circuit configuration 20 is controlled by an electronic controller 50 that interfaces with various components of the hydraulic circuit configuration. For example, the electronic controller 50 receives control input from an operator interface 52 (e.g., a joystick, a lever arm, a wheel, a control board, etc.) through interface line 53. The electronic controller 50 also receives input data/signals from various sensing components provided throughout the hydraulic circuit configuration. For example, interface line 54 connects the electronic controller 50 to pressure sensor 55 that monitors a hydraulic fluid pressure at the first side 27 of the variable displacement pump/motor 28. Also, interface line 56 connects the electronic controller 50 to pressure sensor 57 that monitors a pressure of the first load circuit 26a at the second side 29 of the variable displacement pump/motor 28. Moreover, interface line 58 connects the controller 50 to pressure sensor 59 that monitors an accumulated pressure at the accumulator 30.

The electronic controller 50 controls the operation of the pump 22, the directional flow control valve 32, the variable displacement pump/motor 28, and the return flow control valve 34. As shown at FIG. 1, control line 60 connects the electronic controller 50 to a pump control circuit 99 of the pump 22. The pump control circuit 99 can include a negative flow control orifice 97. Also, control lines 61 connect the electronic controller 50 to the directional flow control valve 32. Further, control line 62 connects the electronic controller 50 to the variable displacement pump/motor 28. Moreover, control line 63 connects the electronic controller 50 to the return flow control valve 34. Also, interface line 96 connects the electronic controller 50 to shaft speed sensor 95 that senses the speed of rotation of the input/output shaft 82 of the pump/motor 28.

It will be appreciated that the pump 22 can be a variable displacement pump that can be operated at different speeds and can also be adjusted to pump different flow rates at a given rotational speed. For example, the pump 22 can include an input shaft 23 driven/rotated by the prime mover 24. The pump 22 can also include a swash plate 70 that can be moved to different angles to adjust the flow output rate from the pump 22 at a given rotational speed of the input shaft 23 (i.e., the volumetric displacement of the pump can be changed). The electronic controller 50 can be configured to adjust the position of the swash plate 70 based on the operational needs of the overall hydraulic circuit configuration 20.

In certain embodiments, the variable displacement pump/motor 28 can include an over-the-center swash plate 80 and the rotational input/output shaft 82. The rotational input/output shaft 82 can be coupled to a mechanical load. The over-the-center swash plate 80 allows the input/output shaft 82 to be driven by the variable displacement pump/motor 28 in both a clockwise direction and a counterclockwise direction. For example, when the swash plate 80 is on one side of center, the input/output shaft 82 is driven in the clockwise direction by the variable displacement pump/motor 28. In contrast, when the swash plate 80 is on the opposite side of the center, the input/output shaft 82 is driven in the counterclockwise direction. Altering the position of the swash plate 80 allows the torque transferred through the pump/motor shaft 82 to be adjusted and concurrently adjusts the volumetric hydraulic fluid displacement of the pump/motor 28. The volumetric hydraulic fluid displacement of the pump/motor 28 is the amount of hydraulic fluid displaced in one rotation of the shaft 82. Similarly, if the hydraulic pressure on the first side 27 of the variable displacement pump/motor 28 varies (e.g. as the accumulator 30 charges or discharges), the position of the swash plate 80 can be adjusted to maintain a desired torque input/output at the input/output shaft 82. It will be appreciated that the position of the swash plate 80 is controlled by the electronic controller 50 via line 62.

The electronic controller 50 controls the rate of acceleration/deceleration by controlling the input/output torque at the input/output shaft 82. The desired input/output torque may be an input torque in the charge mode, and the desired input/output torque may be an output torque in the pump drive mode and the accumulator discharge mode. In a preferred embodiment, the variable displacement pump/motor 28 includes a swash plate and a rotating group, and the amount of hydraulic fluid displaced by the rotating group per shaft rotation is dependent upon an angle of the swash plate. The rotating group can include pistons within a cylinder block, and the swash plate can be used to change stroke lengths of the pistons so as to change the volumetric displacement of the pump/motor 28. In other embodiments, other types of variable displacement pump/motors can be used.

The rate of acceleration of the input/output shaft 82 (i.e., the rate at which the rotational speed of the input/output shaft increases over time) is controlled by the controller 50 based on the value of the operator command received from the operator interface 52 as well as the current operating state of the pump/motor 28. To increase the rate of acceleration, the swash plate 80 is adjusted to increase the torque transferred to the shaft 82 from the pump/motor 28. To decrease the rate of acceleration, the swash plate 80 is adjusted to decrease the torque transferred to the shaft 82 from the pump/motor 28. Power for driving the acceleration is provided by hydraulic pressure/flow from either the pump 22 and/or the accumulator 30. The rate of deceleration of the input/output shaft 82 (i.e., the rate at which the rotational speed of the input/output shaft decreases over time) is controlled by the controller 50 based on the value of the operator command received from the operator interface 52 as well as the current operating state pump/motor 28. To increase the rate of deceleration (i.e., to provide increased braking), the swash plate 80 is adjusted to increase the torque transferred to the shaft 82 from the moving external load. To decrease the rate of deceleration, the swash plate 80 is adjusted to decrease the torque transferred to the shaft 82 from the moving external load. Power from braking during the deceleration is consumed by hydraulic pressure/flow to either the accumulator 30 and/or the pressure relief valves 40, 42.

Figure 7:
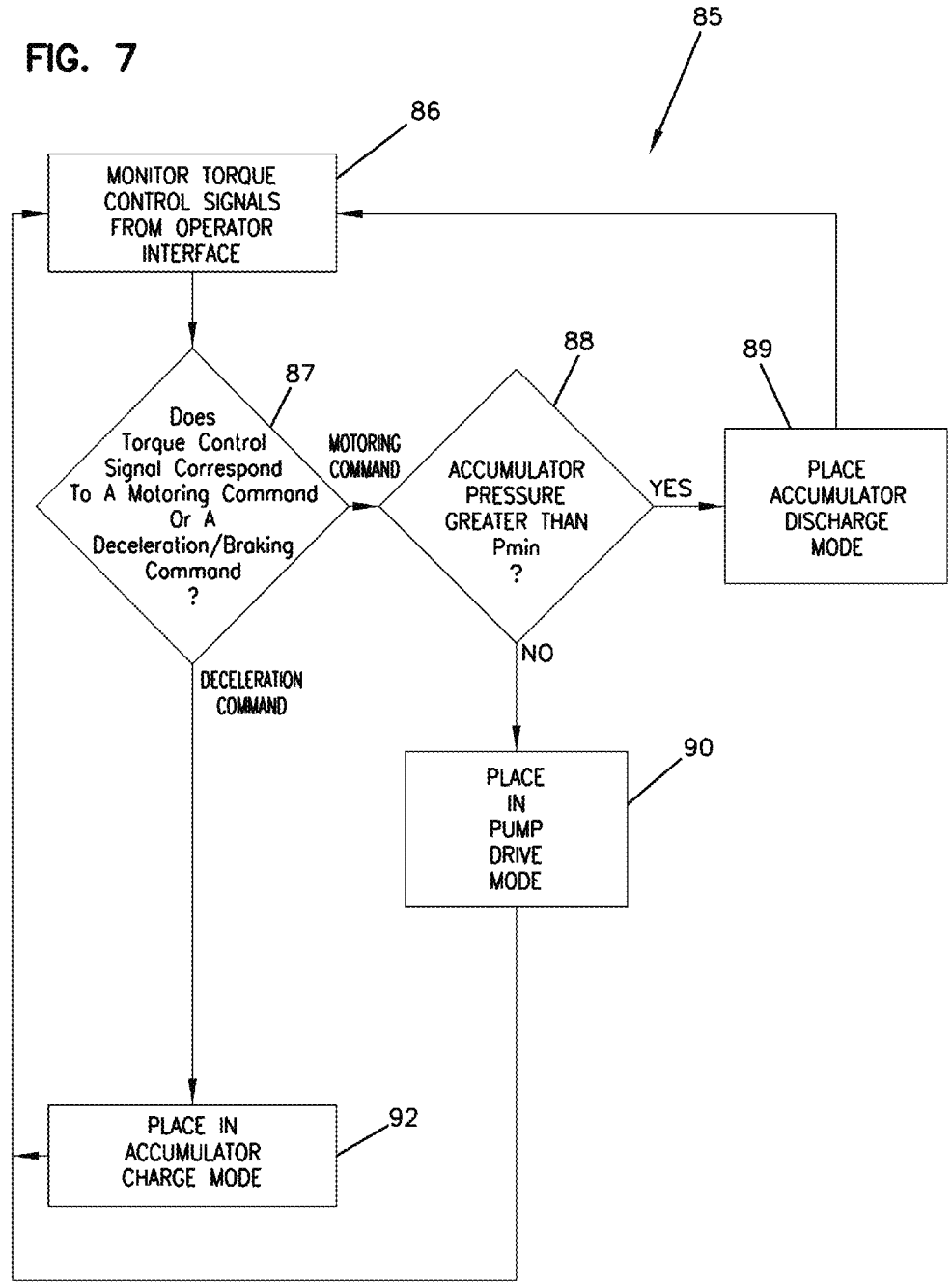
FIG. 7 is a flow chart illustrating control logic for controlling operation of the fluid system of FIG. 1.

FIG. 7 is a flow chart illustrating control logic 85 used by the electronic controller 50 to control operation of the hydraulic circuit configuration 20. Referring to FIG. 7, the control logic 85 starts at box 86 where the electronic controller 50 monitors a torque control signal received from the operator interface 52 via interface line 53. In one embodiment, the torque control signal is dependent upon a position of a joystick provided at the operator interface 52. A value of the torque control signal can be established by a position of the joystick provided at the operator interface 52. At box 87, the controller 50 queries and/or calculates (e.g., determines) whether the value of the torque control signal corresponds to a motoring command (i.e., a command for the pump/motor to function as a motor and drive rotation of the shaft 82 to accelerate rotation of the shaft or maintain an existing rotational speed of the shaft) or a deceleration command (i.e., a command for the pump/motor to function as a pump and brake rotation of the shaft 82 to decelerate rotation of the shaft).

If the value of the torque control signal from the operator station 52 is such that the signal represents a motoring command, the control logic 85 proceeds to box 88 where the electronic controller 50 queries and/or calculates (e.g., determines) whether a pressure P in the accumulator 30 is greater than a pressure $P_{MIN}$. The pressure $P_{MIN}$ equals a minimum pressure and/or a threshold pressure in the accumulator 30 that is sufficient to allow the accumulator 30 to be used as a pressure source for driving the variable displacement pump/motor 28 to satisfy the motoring command. If the pressure P is greater than $P_{MIN}$, the control logic 85 proceeds to box 89 in which the hydraulic circuit configuration 20 is placed in the accumulator discharge mode (see FIG. 4) in which pressure from the accumulator 30 is used to drive the variable displacement pump/motor 28 to cause rotation of the shaft 82 and the load coupled to the shaft 82.

Referring back to box 88, if the accumulator pressure P is less than $P_{MIN}$, the control logic 85 proceeds to box 90 where the hydraulic circuit configuration 20 is placed in the pump drive mode of FIG. 2. In the pump drive mode, pressurized hydraulic fluid output from the pump 22 is used to provide hydraulic fluid flow for driving the variable displacement pump/motor 28 to drive rotation (e.g., accelerate shaft rotational speed or maintain rotational shaft speed) of the shaft 82 and the load connected to the shaft 82. As the shaft 82 is driven, the electronic controller 50 controls the position of the swash plate 80 to provide an output torque at the input/output shaft 82 that provides a shaft drive level dictated by the torque control signal from the operator interface 52. The position of the swash plate 80 and thus the drive/motoring level is controlled by the controller 50 and is dependent upon the value of the torque control signal received from the operator interface 52 and the current real-time operating condition of the pump/motor 28 (e.g., speed and direction of rotation of the input/output shaft 82 as sensed by the sensor 95, the pressure differential across the pump/motor 28, current swash plate position, current flow rate, etc.).

Referring back to box 87, if the value of the torque control signal is such that the torque control signal corresponds to a deceleration command, the control logic proceeds to box 92 where the electronic controller 50 places the hydraulic circuit configuration in the charge mode of FIG. 3. In the charge mode, the pump/motor 28 can be used to brake the shaft 82 to decelerate rotation of the shaft 82 and the load coupled to the shaft 82. Energy corresponding to the deceleration of the load connected to the shaft 82 is recovered by using the energy (e.g., inertial energy) to charge the accumulator 30 (i.e., by pumping fluid into the accumulator 30 with the pump/motor 28). As the shaft 82 is braked, the electronic controller 50 controls the position of the swash plate 80 to provide an input torque at the input/output shaft 82 that provides a shaft braking level dictated by the torque control signal from the operator interface 52. The position of the swash plate 80 and thus the braking level is controlled by the controller 50 and is dependent upon the value of the torque control signal received from the operator interface 52 and the current real-time operating condition of the pump/motor 28 (e.g., speed and direction of rotation of the input/output shaft 82 as sensed by the sensor 95, the pressure differential across the pump/motor 28, current swash plate position, current flow rate, etc.). By using the swash plate 80 position to control the deceleration, the need for throttling is minimized or eliminated thereby enhancing the overall efficiency of the fluid system 10. Throughout the entire control logic 85, the electronic controller 50 continuously monitors the torque control signals received from the operator interface 52 and the sensors (e.g., pressure sensors 55, 57, and 59) so that the fluid system 10 can promptly respond to changes in the operator interface commands.

In certain embodiments, the electronic controller 50 interfaces with memory 81 (e.g., Random Access Memory, Read Only Memory, or other data storage means) that stores algorithms, look-up tables, look-up graphs, look-up charts, control models, empirical data, control maps, or other information that can be accessed for use in controlling the operation of the hydraulic circuit configuration 20. For example, a control model can be stored in memory and used by the controller 50 to determine a torque level needed at the input/output shaft 82 taking into consideration a value of a torque control signal received from the operator interface 52 and a current rotational speed and direction of the shaft 82. The position of the swash plate 80 can be dependent upon a value of the torque control signal received from the operator interface 52, the rotational speed of the input/output shaft 82 of the variable displacement pump/motor 28, the pressure differential across the variable displacement pump/motor 28 and the current displacement of the variable displacement pump/motor 28. It will be appreciated that the pressure differential is a function of the flow provided to/across the variable displacement pump/motor 28 by the pump 22 or the accumulator 30.

Figure 8:
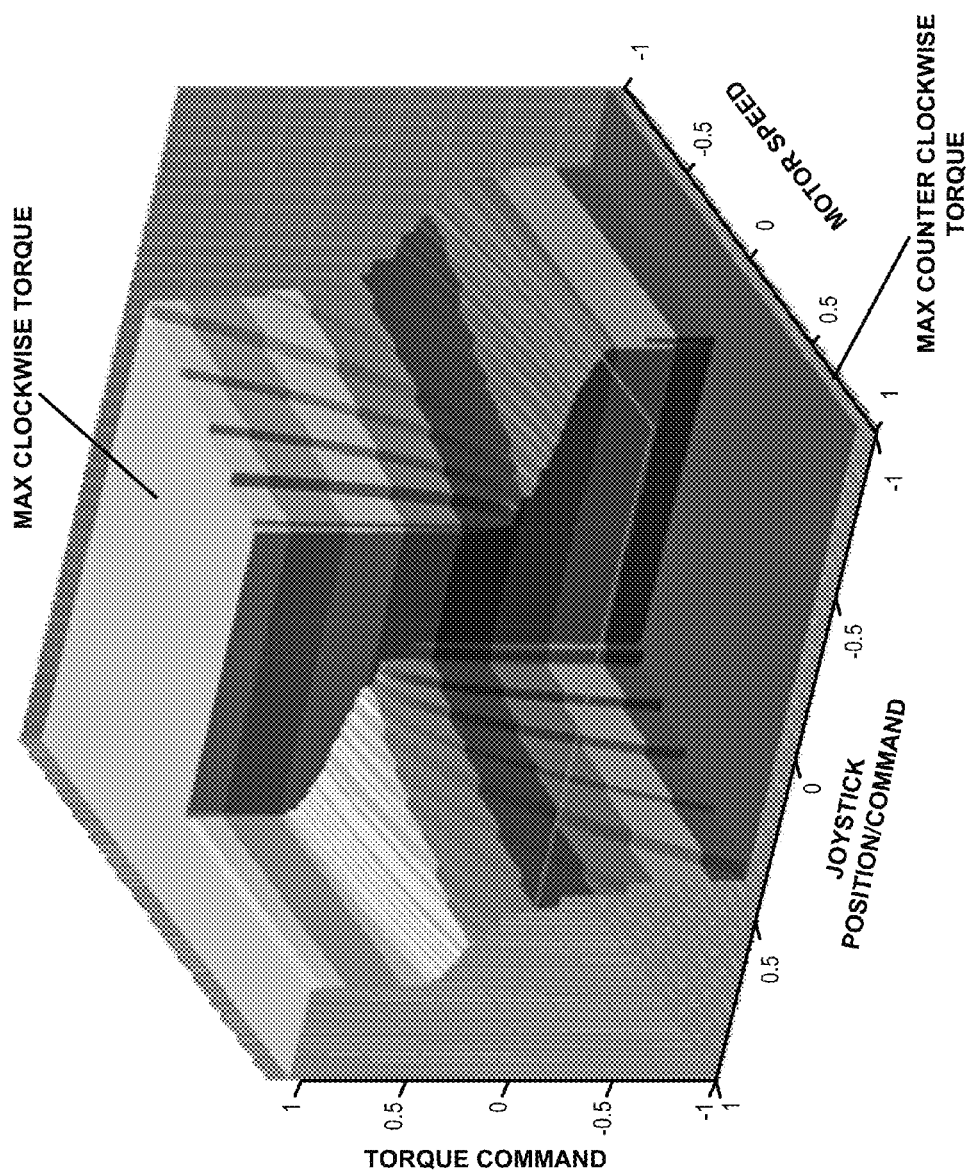
FIG. 8 is a control map represented as a surface, the control map can be accessed by a controller of the fluid system of FIG. 1 for controlling operation of the system.

An example model for controlling the hydraulic circuit configuration 20 is shown at FIG. 8. FIG. 8 shows a control map surface where the z-axis represents torque command, and the x and y axes represent joystick signal (i.e., the torque control signal from the operator interface) and sensed rotational speed of the input/output shaft 82 of the variable displacement pump/motor 28, respectively. The value of the joystick signal is determined by the position of a joystick provided at the operator interface 52. The joystick is moved by the operator to control operation of the hydraulic system. The joystick is moved to a positive position to cause clockwise rotation of the pump/motor 28, and is moved to a negative position to cause counterclockwise rotation of the pump/motor 28.

The motor speed is determined by data received by the controller 50 from the rotational speed sensor 95. Thus, the motor speed represents the actual real-time rotational speed and direction of the shaft 82 at the time a given joystick command is received. As depicted, clockwise rotation is positive and counterclockwise rotation is negative. The controller 50 can also monitor pressure differential across the pump/motor 28.

The torque values/commands represent the amount of torque needed to reach an operating condition corresponding to the joystick position taking into consideration the actual real-time speed and direction of rotation of the shaft 82. The control map surface shown at FIG. 8 provides a mapping of torque values and/or torque command values. A top horizontal plane of the map surface represents a maximum clockwise torque (e.g., a saturation limit of the clockwise torque) and a bottom horizontal plane of the map surface represents a maximum counterclockwise torque (e.g., a saturation limit of the counterclockwise torque). A sloped surface or sloped surfaces between the top and bottom planes represents transitional torque values between the maximum torque values.

In use of the control system, an operator moves the joystick to a joystick position corresponding to a desired operating condition of the pump/motor 28. The amount and direction of torque that is to be applied at the shaft 82 is determined from the control model (i.e., the torque mapping) based on the joystick position and the sensed rotational speed of the shaft 82. Once the torque is determined, the controller adjusts the swash plate 80 accordingly to provide the torque level determined by the control model. If the torque command determined, based on the value of the torque control signal from the joystick and the current rotational speed and direction of the shaft 82, has the same direction as the current real time torque being applied to the shaft 82 (e.g., both torques are in a clockwise direction or both torques are in a counterclockwise direction), then the torque command is a motoring command. In such a case, the position of the joystick generates a torque control signal that corresponds to a motoring command. If the torque command determined, based on the value of the torque control signal from the joystick and the current rotational speed and direction of the shaft 82, has the opposite direction as the current real time torque being applied to the shaft 82 (e.g., one torque has a clockwise direction and the other torque has a counterclockwise direction), then the torque command is a deceleration command. In such a case, the position of the joystick generates a torque control signal that corresponds to a deceleration command.

In a preferred embodiment, the control map is arranged to cause the fluid system 10 to simulate or emulate a conventional fluid system (i.e., a base line system). The operating characteristics of the fluid system 10 can be modified by rearranging the control map of the fluid system 10. The characteristics of the fluid system 10 can thereby be modified, tailored, etc. with minimal or no change in hardware.

In certain embodiments, the pump 22 can be controlled by the electronic controller 50 using a negative flow control (NFC) pump control strategy. In a preferred embodiment, the control map is arranged to cause the fluid system 10 to simulate or emulate a conventional fluid system that uses an NFC pump control strategy. The hydraulic flow rate across the pump/motor 28 can be controlled by the negative flow control pump strategy, the load pressure and the control valve orifice area provided at the directional flow control valve 32. The electronic controller 50 can control the valve 32 so as to provide a desired orifice area at the valve 32.

Aspects of the system disclosed herein facilitate bringing the system to market by reducing the amount of hardware development required, and by allowing the "feel" of the system to be customized to a given operator's preference without requiring significant hardware development.

Figure 9:
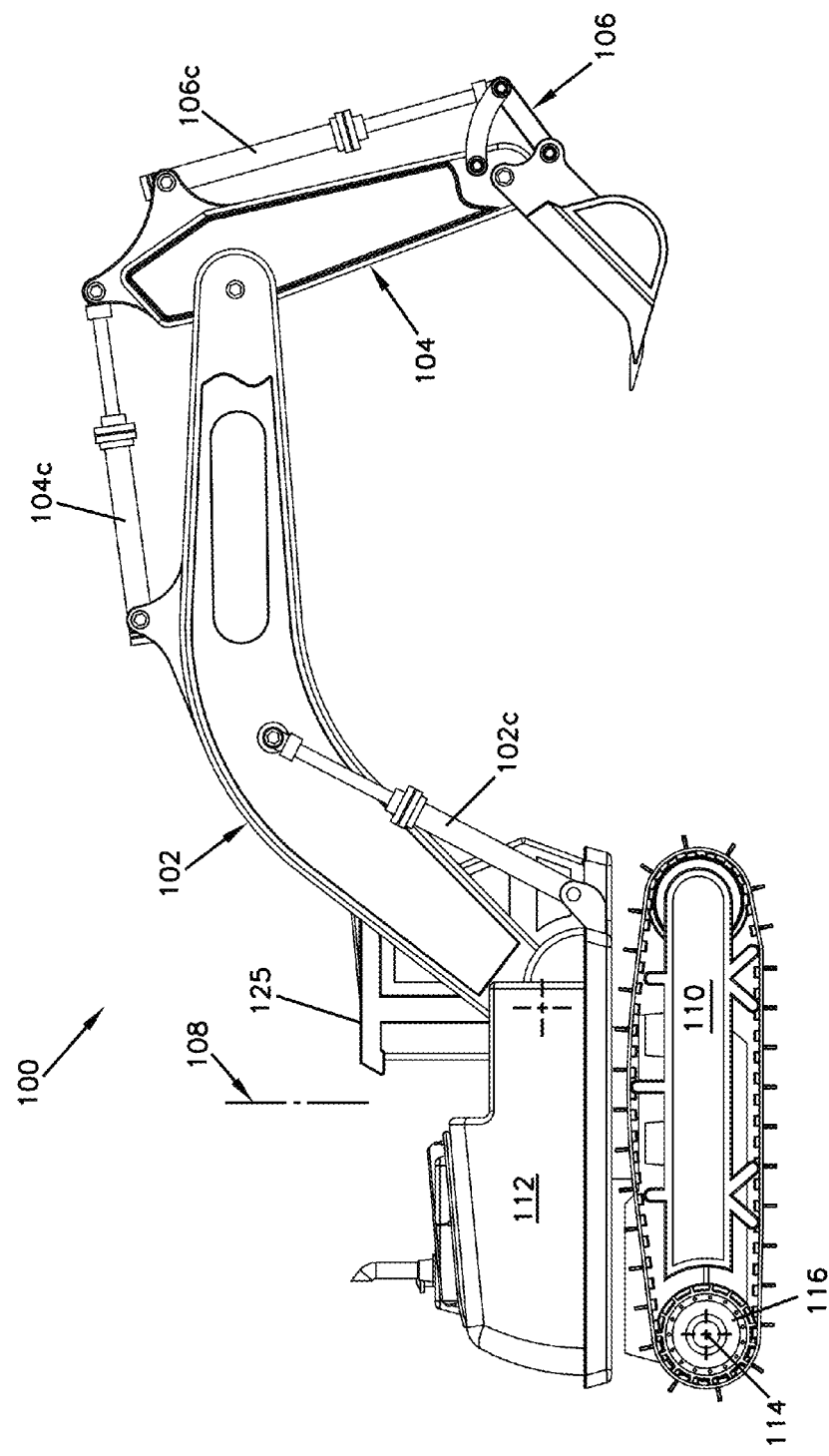
FIG. 9 is a schematic right elevation illustration of an excavator in which the fluid system of FIG. 1 may be incorporated.
Figure 10:
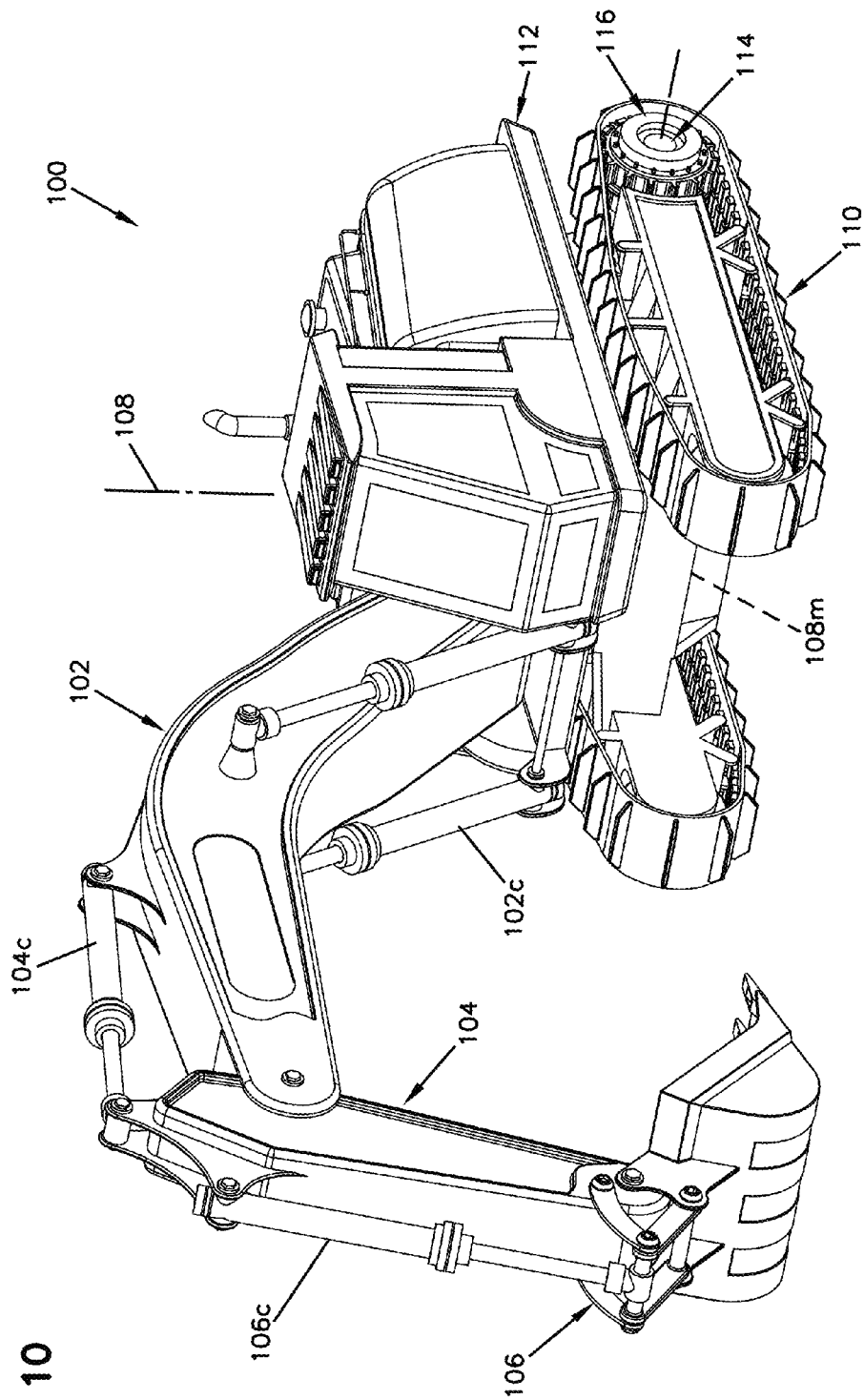
FIG. 10 is a schematic perspective illustration of the excavator of FIG. 9.

In one example embodiment, the hydraulic circuit configuration 20 is incorporated into a piece of mobile excavation equipment such as an excavator. For example, FIGS. 9 and 10 show an example excavator 100 including an upper structure 112 supported on an undercarriage 110. The undercarriage 110 includes a propulsion structure for carrying the excavator 100 across the ground. For example, the undercarriage 110 can include left and right tracks. The upper structure 112 is pivotally movable relative to the undercarriage 110 about a pivot axis 108 (i.e., a swing axis). In certain embodiments, the variable displacement pump/motor 28 of the hydraulic circuit configuration 20 can be used as a swing motor for pivoting the upper structure 112 about the swing axis 108 relative to the undercarriage 110.

The upper structure 112 can support and carry the prime mover 24 and can also include a cab 125 in which the operator interface 52 is provided. A boom 102 is carried by the upper structure 112 and is pivotally moved between raised and lowered positions by a boom cylinder 102c. In certain embodiments, the boom cylinder 102c can be part of the second load circuit 26b. An arm 104 is pivotally connected to a distal end of the boom 102. An arm cylinder 104c is used to pivot the arm 104 relative to the boom 102. In certain embodiments, the arm cylinder 104c can be part of a further load circuit (i.e., a circuit similar to circuit 26b) of the hydraulic circuit configuration 20. The excavator 100 also includes a bucket 106 pivotally connected to a distal end of the arm 104. A bucket cylinder 106c is used to pivot the bucket 106 relative to the arm 104. In certain embodiments, the cylinder 106c can be part of a further load circuit (e.g., a circuit similar to circuit 26b) of the hydraulic circuit configuration 20. In certain embodiments, the third load circuit 26c can drive a hydraulic motor 114 used to propel the left and/or the right drive tracks of the propulsion system.

Many conventional excavating machines use pressurized hydraulic fluid to provide power to linear actuators (e.g., hydraulic cylinders) and rotary actuators (e.g., hydraulic motors) of the excavating machine. Conventional excavating machines have many of the features of the example excavator 100. The linear actuators may drive various linkages of the excavating machine. For example, a boom linkage, an arm linkage, and a bucket linkage may each be driven by a dedicated hydraulic cylinder or cylinders such as the hydraulic cylinders 102c, 104c, 106c, respectively. The rotary actuators may drive relative movement across various rotating joints of the excavating machine. For example, a swing motor may drive a swing joint similar to the swing joint 108 between an undercarriage and an upper structure about a swing axis of the excavating machine, and a track motor 114 may drive a track drive 116 of the excavating machine.

The fluid system 10 can be arranged (e.g., by arranging the control map) such that the example excavator 100 emulates a conventional excavation machine. By emulating a conventional excavation machine, an operator familiar with operating the conventional excavation machine may operate the excavator 100 with high productivity, relying on the prior operating experience.

As was described in detail above, the present disclosure provides a method for efficiently transferring power between the pressurized hydraulic fluid and the actuators. In particular, the fluid system 10 of the present disclosure efficiently transfers power from the pressurized hydraulic fluid to a rotary actuator (e.g., the variable displacement pump/motor 28) and efficiently transfers power to the pressurized hydraulic fluid from the rotary actuator (e.g., the variable displacement pump/motor 28). In addition, the method and the fluid system 10 of the present disclosure efficiently stores power from the rotary actuator to the hydraulic accumulator 30, via pressurized hydraulic fluid, and efficiently retrieves the power from the hydraulic accumulator 30 and delivers it to the rotary actuator, via the pressurized hydraulic fluid. In the depicted embodiment, the rotary actuator serves as a swing motor of an excavator.

In a conventional excavating machine, the pressurized hydraulic fluid is typically pressurized by a hydraulic pump that draws low pressure hydraulic fluid from a hydraulic reservoir (i.e., a hydraulic tank). The hydraulic pump is typically powered by a prime mover (e.g., a diesel engine). As the power is delivered to a given actuator by the pressurized hydraulic fluid, the pressure of the pressurized hydraulic fluid flowing through the actuator decreases. Upon the hydraulic fluid flowing through the actuator, the hydraulic fluid is returned to the hydraulic reservoir at a low pressure. The hydraulic fluid may pass through a heat exchanger to dissipate heat from the hydraulic fluid. As the hydraulic fluid circulates between the pump, the actuator or actuators, and the hydraulic reservoir in a closed loop, a hydraulic circuit is formed.

In the depicted embodiment, the pressurized hydraulic fluid is pressurized by the pump 22 that draws low pressure hydraulic fluid from the hydraulic reservoir 44 (i.e., a hydraulic tank). The pump 22 thereby provides hydraulic power to the pressurized hydraulic fluid. The pump 22 is, in turn, powered by the prime mover 24 (e.g., a diesel engine). The hydraulic power from the pump 22 may be selectively delivered to a number of actuators by the pressurized hydraulic fluid, as mentioned above.

As depicted, the rotary actuators and the linear actuator are hydraulically connected to the pump 22 via control valves. Other actuators may be further hydraulically connected to the pump 22. The rotary actuators may include, for example, track motors 114 (i.e., a right track motor or a left track motor). The linear actuators may include, for example, the boom linkage hydraulic cylinder 102c, the arm linkage hydraulic cylinder 104c, and/or the bucket linkage hydraulic cylinder 106c. As the hydraulic power is delivered, the pressure of the pressurized hydraulic fluid flowing through the actuator or actuators decreases. Upon the hydraulic fluid flowing through the actuators, the hydraulic fluid is returned to the hydraulic reservoir 44 at a low pressure. The hydraulic fluid may pass through a heat exchanger to dissipate heat from the hydraulic fluid. As the hydraulic fluid circulates between the pump 22, the actuator or actuators, and the hydraulic reservoir 44 in a closed loop, a hydraulic circuit is formed.

As was described in detail above, the rotary actuator (e.g. the variable displacement pump/motor 28) may be isolated from the pump 22 and instead receive hydraulic power from the hydraulic accumulator 30. The rotary actuator may also deliver hydraulic power to the hydraulic accumulator 30. The rotary actuator may also dump hydraulic power across on or more pressure relief valves (e.g. when the hydraulic accumulator 30 has reached its energy storing capacity). The pressure relief settings of the pressure relief valves may effectively define the top and bottom limits of the control map of the fluid system 10.

A given rotary hydraulic component in a hydraulic circuit (e.g., a hydraulic pump, a hydraulic motor, or a hydraulic pump/motor) typically has two main ports (i.e., a first port and a second port). In the hydraulic pump and the hydraulic motor, the first port can be an inlet port and the second port can be an outlet port and the hydraulic fluid typically flows from the inlet port to the outlet port. Certain variable displacement hydraulic pump/motors (e.g., the variable displacement pump/motor 28) can vary displacement by adjustment of a swash plate within the variable displacement hydraulic pump/motor and furthermore can reverse the relationship between fluid flow direction and the input/output shaft rotational direction. Such two port rotary hydraulic components typically have substantially the same flow rate at the first port and the second port. Minor differences in the flow rates at the two ports can be caused by, for example, internal leakage of the rotary hydraulic component.

Two primary variables at any point of the hydraulic circuit are hydraulic pressure and flow rate. The product of the hydraulic pressure and flow rate are substantially related to available power at a given point in the hydraulic circuit. As the flow rate is substantially the same between the two ports of a given rotary hydraulic component, the power delivered to or received from the given rotary hydraulic component by the pressurized hydraulic fluid is substantially equal to the product of the flow rate through the given rotary hydraulic component and the difference between the hydraulic pressures at the two ports of the given rotary hydraulic component (i.e., a pressure drop or a pressure rise). If the difference between the hydraulic pressures at the two ports of the given rotary hydraulic component decreases in the direction of hydraulic fluid flow, a pressure drop is occurring and the given rotary hydraulic component is receiving power from the pressurized hydraulic fluid. If the difference between the hydraulic pressures at the two ports of the given rotary hydraulic component increases in the direction of hydraulic fluid flow, a pressure rise is occurring and the given rotary hydraulic component is delivering power to the pressurized hydraulic fluid. A certain, typically small, portion of the power transferred between the pressurized hydraulic fluid and the given rotary hydraulic component is lost to heat because of inefficiencies of the given rotary hydraulic component.

Certain rotary hydraulic components are matched with another rotary hydraulic component or components in a dedicated hydraulic circuit. For example, a hydrostatic transmission typically includes a dedicated pump hydraulically coupled to a dedicated motor or set of dedicated motors. In such matched sets of rotary hydraulic components, the hydraulic pressure and flow rate are continuously matched to external loads on the motor or motors. This is typically done by using a variable displacement pump. In such matched sets of rotary hydraulic components, the portion of the hydraulic power lost to heat may be substantially limited to the inefficiencies of the given rotary hydraulic components and fluid friction in various tubes and hoses connecting the rotary hydraulic components.

In certain hydraulic systems (e.g., the fluid system 10 and a hydraulic system of a conventional excavator) certain rotary hydraulic components are shared among two or more rotary hydraulic components that are not directly related. For example, in the conventional excavating machines, a common pump may be shared by the swing motor and the track motor. The common pump may be further shared by other hydraulic components (e.g., hydraulic cylinders). In such sets of hydraulic components, the hydraulic pressure and/or flow rate of the common pump may not necessarily match external loads on either or both of the motors (e.g., the swing motor and the track motor) or external loads on the other hydraulic components. To match the hydraulic power of the pump with the hydraulic power collectively required by each of the motors and each of the other hydraulic components, the hydraulic fluid flow to and/or from each of the motors and/or each of the other hydraulic components may be throttled in the conventional hydraulic system, for example by a throttling valve. In contrast, the variable displacement pump/motor 28 typically does not need to be throttled except when the accumulator 30 is full. To reduce or eliminate such situations where the accumulator 30 is full, the accumulator 30 can be sized appropriately, in view of a duty cycle of the excavator 100. The size of the accumulator 30 may be selected based on the economics of energy saving versus the cost of upsizing the accumulator 30.

As with the rotary hydraulic components, the flow rate may be substantially the same between two ports of a given throttling valve. The power delivered to the throttling valve by the pressurized hydraulic fluid is substantially equal to the product of the flow rate through the throttling valve and the difference between the hydraulic pressures at the two ports of the throttling valve. In the case of the throttling valve, the difference between the hydraulic pressures at the two ports is a pressure drop (i.e., the pressure decreases in the direction of hydraulic fluid flow). The power delivered to the throttling valve by the pressurized hydraulic fluid is transformed into heat and is typically wasted. The waste heat typically must be removed by a cooling system of the excavation machine.

In a conventional excavator, throttling influences the operating characteristics of the excavator. In the present disclosure, the fluid system 10 and the excavator 100 emulate the conventional excavator without throttling while actuating the swing drive and while recovering inertial energy with the swing drive.

The fluid system 10 provides parallel power sources (i.e., the pump 22 and the accumulator 30) to the hydraulic loads. The fluid system 10 thereby may supply more total power to the collective hydraulic loads. This may result in higher performance of the excavator 100 for a given size of the prime mover 24. Alternatively, the prime mover 24 may be downsized and the excavator 100 may achieve the same or similar performance as the conventional excavator.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A hydraulic system adapted to recover inertial energy, the hydraulic system comprising:
   a pump;
   a variable displacement pump/motor having an input/output shaft adapted for connection to a load;
   an accumulator having a charging state and a fully charged state;
   at least one pressure relief valve having pressure relief settings, the at least one pressure relief valve being adapted to limit a differential pressure across the variable displacement pump/motor when a set pressure is exceeded;

the variable displacement pump/motor being operable in: a) a first mode where the variable displacement pump/motor is driven by the pump to rotate the input/output shaft and the load; b) a second mode where the variable displacement pump/motor uses inertial energy from a deceleration of the load to charge the accumulator; c) a third mode where the variable displacement pump/motor is driven by the accumulator to rotate the input/output shaft and the load; and d) a fourth mode where the variable displacement pump/motor dumps inertial energy from a deceleration of the load on the at least one pressure relief valve when the accumulator is in the fully charged state;

a controller for controlling operation of the pump and the variable displacement pump/motor, the controller controlling the variable displacement pump/motor to control a torque transferred through the input/output shaft of the variable displacement pump/motor;

an operator interface for inputting a torque control signal to the controller for controlling a direction of rotation of the input/output shaft and for controlling a speed of rotation of the input/output shaft; and memory storing a control model including a three-dimensional control map that defines a relationship between a value of the torque control signal, a sensed rotational speed of the input/output shaft of the variable displacement pump/motor, and a torque command that establishes an amount of torque to be transferred through the input/output shaft of the variable displacement pump/motor, the controller using the control model to determine the amount of torque to be transferred through the input/output shaft, the three-dimensional control map including a three-dimensional control map surface defined along first, second and third axes that are perpendicular to one another, the first axis corresponding to the torque command, the second axis corresponding to the torque control signal and the third axis corresponding to the sensed rotational speed of the input/output shaft; and wherein the pressure relief settings of the at least one pressure relief valve define a top horizontal plane of the control map surface and a bottom horizontal plane of the control map surface, wherein the top horizontal plane corresponds to a torque command establishing a maximum clockwise torque, and wherein the bottom horizontal plane corresponds to a torque command establishing a maximum counterclockwise torque.

2. The hydraulic system of claim 1, wherein the variable displacement pump/motor includes a swash plate, and wherein the controller controls a position of the swash plate to control a torque transferred through the input/output shaft of the variable displacement pump/motor during braking.

3. The hydraulic system of claim 2, wherein the swash plate is an over-the-center swash plate.

4. The hydraulic system of claim 1, wherein the controller interfaces with a speed sensor that senses the rotational speed of the input/output shaft.

5. The hydraulic system of claim 1, wherein the controller interfaces with a pressure sensor arrangement that senses a pressure differential across the variable displacement pump/motor.

6. The hydraulic system of claim 1, further comprising a pressure sensor for sensing a charge pressure of the accumulator, wherein the controller only shifts the valve arrangement to the third mode when the charge pressure is greater than a pre-determined threshold charge pressure.

7. The hydraulic system of claim 1, wherein the variable displacement pump/motor pivots an upper structure of an excavator about a swing axis relative to an undercarriage of the excavator, and wherein the upper structure includes an excavation boom.

8. The hydraulic system of claim 7, wherein the pump also drives a hydraulic cylinder used to pivot the excavation boom up and down.

9. The hydraulic system of claim 8, wherein the pump also drives a hydraulic motor powering a track of the undercarriage.

10. The hydraulic system of claim 1, wherein the variable displacement pump/motor includes a swash plate, and wherein the controller adjusts a position of the swash plate to alter a torque applied through the input/output shaft in response to a value of the torque control signal.

11. The hydraulic system of claim 1, wherein the torque control signal is generated by a joystick.

12. The hydraulic system of claim 1, wherein the three-dimensional map surface includes a sloped surface or surfaces between the top and bottom horizontal planes that correspond to torque commands establishing transitional torque values between the maximum clockwise and counterclockwise torques.

13. The hydraulic system of claim 1, wherein the controller and the control model provide means for emulating a base line system.

14. The hydraulic system of claim 1, wherein the controller uses a negative flow control pump control strategy to control the pump.

15. The hydraulic system of claim 14, wherein the controller and the control model provide means for emulating a conventional fluid system that uses a negative flow control pump control strategy.

16. A hydraulic swing drive for use on an excavating machine, the hydraulic swing drive urging acceleration and deceleration on an excavating structure of the excavating machine, the hydraulic swing drive comprising:

a hydraulic pump producing a pump pressure of hydraulic fluid in a pump supply line;

an accumulator with hydraulic fluid under an accumulator pressure, the accumulator in fluid communication with an accumulator line, the accumulator having a charging state and a fully charged state;

a tank with hydraulic fluid in fluid communication with a tank line;

a variable displacement pump/motor selectively urging the acceleration and the deceleration on the excavating structure, the variable displacement pump/motor in fluid communication with a first line and a second line of the variable displacement pump/motor, the variable displacement pump/motor including a swash plate; and a valve arrangement selectively connecting the accumulator line with the first line of the variable displacement pump/motor and selectively connecting the tank line with the second line of the variable displacement pump/motor when the accumulator pressure is greater than a threshold pressure and the acceleration of the excavating structure is requested, the valve arrangement selectively connecting the pump supply line with the first line of the variable displacement pump/motor and selectively connecting the tank line with the second line of the variable displacement pump/motor when the accumulator pressure is less than or equal to the threshold pressure and the acceleration of the excavating structure is requested, and the valve arrangement selectively connecting the accumulator line with the second line of the variable displacement pump/motor and selectively connecting the tank line with the first line of the variable displacement pump/motor when the deceleration of the excavating structure is requested and accumulator charging is desired;
the swing drive being operable in a first state in which a controller controls a position of the swash plate to selectively increase and decrease a rate of deceleration of the excavation structure without throttling, and the swing drive also being operable in a second state in which the variable displacement pump/motor dumps inertial energy from a deceleration of the excavating structure on at least one pressure relief valve when the accumulator is in the fully charged state.

17. The hydraulic swing drive of claim 16, wherein the variable displacement pump/motor is an over-center variable displacement pump/motor.

18. The hydraulic swing drive of claim 17, further comprising a controller and an operator interface, the operator interface generating an acceleration request signal when the acceleration of the excavating structure is requested, the operator interface generating a deceleration request signal when the deceleration of the excavating structure is requested, the controller receiving the acceleration and the deceleration request signals, and the controller sending at least one valve signal to the valve arrangement when the controller receives the acceleration or the deceleration request signals.

19. A hydraulic system adapted to recover inertial energy, the hydraulic system comprising:
 a pump;
 a variable displacement pump/motor having an input/output shaft adapted for connection to a load;
 an accumulator;
 at least one pressure relief valve having pressure relief settings;
 a valve arrangement operable in: a) a first mode where the variable displacement pump/motor is driven by the pump to rotate the input/output shaft and the load; b) a second mode where the variable displacement pump/motor uses inertial energy from a deceleration of the load to charge the accumulator; and c) a third mode where the variable displacement pump/motor is driven by the accumulator to rotate the input/output shaft and the load;
 a controller for controlling operation of the pump, the variable displacement pump/motor and the valve arrangement, the controller controlling the variable displacement pump/motor to control a torque transferred through the input/output shaft of the variable displacement pump/motor;
 an operator interface for inputting a torque control signal to the controller for controlling a direction of rotation of the input/output shaft and for controlling a speed of rotation of the input/output shaft, wherein when the torque control signal corresponds to a deceleration command, the controller shifts the valve arrangement to the second mode, and wherein the variable displacement pump/motor provides a pumping and braking function when the valve arrangement is in the second mode; and
 memory storing a control model including a three-dimensional control map that defines a relationship between a value of the torque control signal, a sensed rotational speed of the input/output shaft of the variable displacement pump/motor, and a torque command that establishes an amount of torque to be transferred through the variable displacement pump/motor, the controller using the control model to determine the amount of torque to be transferred through the input/output shaft, the three-dimensional control map including a three-dimensional control map surface defined along first, second and third axes that are perpendicular to one another, the first axis corresponding to the torque command, the second axis corresponding to the torque control signal and the third axis corresponding to the sensed rotational speed of the input/output shaft;
 wherein the pressure relief settings of the at least one pressure relief valve define a top horizontal plane of the control map surface and a bottom horizontal plane of the control map surface, wherein the top horizontal plane corresponds to a torque command establishing a maximum clockwise torque, and wherein the bottom horizontal plane corresponds to a torque command establishing a maximum counterclockwise torque; and
 wherein the valve arrangement includes a three-position directional flow control valve and a return flow control valve, wherein in the first mode the directional flow control valve places an outlet side of the pump in fluid communication with a first side of the variable displacement pump/motor and the return flow control valve places a second side of the variable displacement pump/motor in fluid communication with a tank, wherein in the second mode the directional flow control valve blocks fluid communication between the pump and the first side of the variable displacement pump/motor and the return flow control valve blocks fluid communication between the second side of the variable displacement pump/motor and the tank, and wherein in the third mode the directional flow control valve places the accumulator in fluid communication with the first side of the variable displacement pump/motor and the return flow control valve places the second side of the variable displacement pump/motor in fluid communication with the tank.

20. The hydraulic system of claim 19, wherein in the second mode a first check valve allows fluid communication between the tank and the first side of the variable displacement pump/motor and a second check valve allows fluid communication between the second side of the variable displacement pump/motor and the accumulator.

21. The hydraulic system of claim 19, further comprising first and second parallel flow lines that cross-connect the first and second sides of the variable displacement pump/motor, the first flow line including two pressure relief valves and the second flow line including two check valves, the first and second flow lines being fluidly connected to each other at locations between the check valves and between the pressure relief valves.

22. The hydraulic system of claim 21, further comprising a tank line that by-passes the return flow control valve and connects to the second line between the check valves.

23. A hydraulic system adapted to recover inertial energy, the hydraulic system comprising:
 a variable displacement pump/motor having an input/output shaft adapted for connection to a load;
 a controller for controlling the variable displacement pump/motor, the controller controlling the variable displacement pump/motor to control a torque transferred through the input/output shaft of the variable displacement pump/motor;
 memory storing a control model including a three-dimensional control map that defines a relationship between a value of the torque control signal, a sensed rotational speed of the input/output shaft of the variable displacement pump/motor, and a torque command that establishes an amount of torque to be transferred through the variable displacement pump/motor, the controller using the control model to determine the amount of torque to be transferred through the input/output shaft, the three-dimensional control map including a three-dimensional control map surface defined along first, second and third axes that are perpendicular to one another, the first axis corresponding to the torque command, the second axis corresponding to the torque control signal and the third axis corresponding to the sensed rotational speed of the input/output shaft;

at least one pressure relief valve, the at least one pressure relief valve being adapted to limit a differential pressure across the variable displacement pump/motor when a set pressure is exceeded; and an accumulator, the accumulator having a charging state and a fully charged state;

wherein a deceleration of the load charges the accumulator when the accumulator is in the charging state; and wherein the variable displacement pump/motor is configured to dump inertial energy from a deceleration of the load on the at least one pressure relief valve when the accumulator is in the fully charged state.

24. The hydraulic system of claim 23, wherein a portion of the three-dimensional control map corresponds to generating a signal by the controller for decelerating the input/output shaft.

* * * * *